No. 655,306. Patented Aug. 7, 1900.
R. H. NYLAND & F. C. LINDT.
AUTOMATIC DUST GUARD.
(Application filed May 8, 1900.)
(No Model.)
Fig. 1.
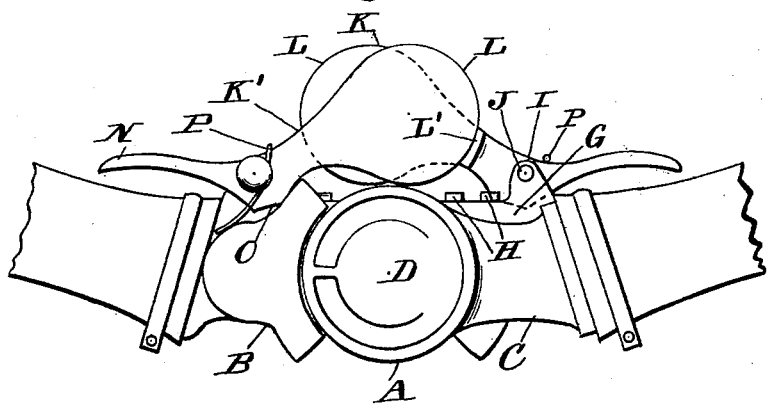
Fig. 2.
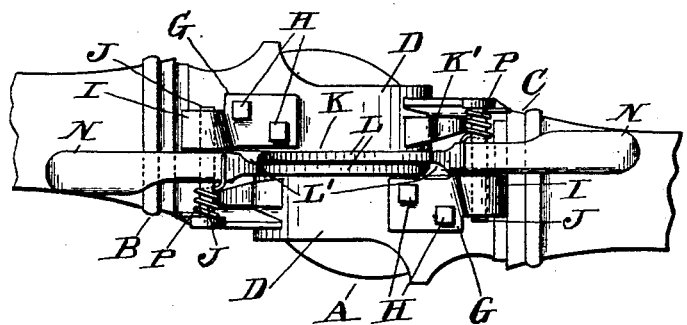
Fig. 3.
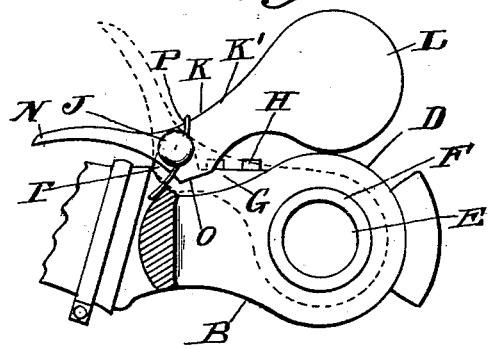
Fig. 4.
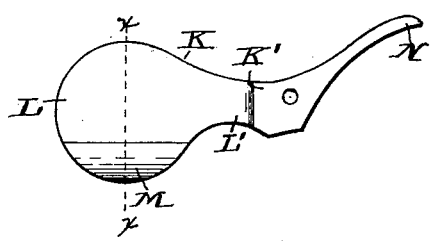
Fig. 5.
WITNESSES
Jos. H. Blackwood
D. H. Randolph Jr.
INVENTORS
Richard H. Nyland
Frederick C. Lindt
by D. H. Gowrick
Attorney.

UNITED STATES PATENT OFFICE.

RICHARD H. NYLAND AND FREDERICK C. LINDT, OF ST. CLOUD, MINNESOTA.

AUTOMATIC DUST-GUARD.

SPECIFICATION forming part of Letters Patent No. 655,306, dated August 7, 1900.

Application filed May 8, 1900. Serial No. 15,937. (No model.)

*To all whom it may concern:*

Be it known that we, RICHARD H. NYLAND and FREDERICK C. LINDT, citizens of the United States, residing at St. Cloud, in the county of Stearns and State of Minnesota, have invented certain new and useful Improvements in Automatic Dust-Guards for Air-Brake Couplings, of which the following is a specification.

Our invention relates to an improvement in an automatic dust-guard for air-brake couplings, and has for its object to provide a guard which will effectually exclude dust, dirt, cinders, and other foreign matters likely to cut, clog, or otherwise injure the interior parts of the pneumatic apparatus when the hose-pipe couplings of an air-brake system are uncoupled and at the same time allow a sufficient quantity of air to escape to apply the brakes should the train break in two or part while in motion.

It further has for its object to provide a dust-guard which can be applied to any air-brake coupling, which is simple and inexpensive in construction, and which will operate automatically and instantaneously on the separation of the coupling.

Our invention consists of the features and combination of features, as more fully hereinafter described and claimed.

Referring to the drawings, which illustrate our invention, Figure 1 is a plan view of a pneumatic hose or pipe coupling with the automatic dust-guard applied thereto in operative position; Fig. 2, a side view in elevation of the same; Fig. 3, a plan view of one section of a hose or pipe coupling and the automatic dust-guard, with the guard shown as in dotted line in its closed position sealing the air-brake hose; Fig. 4, a detail of one of the guards, and Fig. 5 a cross-section on line *x x* of Fig. 4.

In the drawings, in which like letters of reference denote like parts throughout the several views, A represents a pneumatic air-brake coupling made in two parts or halves B C, adapted to interlock and form a continuous fluid-pressure passage. Each of said parts is provided with a head D, having an air-opening E, and with a packing-ring F, of rubber or other suitable material, all of the usual construction now in common use.

G is a bracket secured to the head D by screws H and provided with an upwardly-projecting lug I.

J is a pin or screw-bolt adapted to be screwed into said lug I.

K is the automatic dust-guard, which is pivoted to the pin J, comprising a lever K', provided with a flat circular head or disk L, recessed at L' to allow it to pass the head of the lever on the opposite coupling when the two parts of the coupling are coupled together. Said head L has its lower edge tapered or beveled at M for the purpose of allowing it to slide freely over the face of the rubber gasket of the air-opening.

N is the handle.

O is a stop or shoulder which is adapted to strike the upper portion of the head of the coupling, and thus limit the downward movement and prevent the dust-guard from swinging too far when it is thrown down in its closed position covering the air-opening E.

P is a spiral spring mounted on the pin J, one end bearing on the top of the dust-guard and the opposite bearing on the coupling-head.

When the hose-pipe couplings of an air-brake system are uncoupled, the couplings are usually connected to what is termed a "dummy" coupling, and to make this connection it is necessary to bend the hose-pipe, which produces breaks or kinks in it and injures the same. By the use of our invention these dummies are dispensed with and the end of the hose is allowed to hang straight down, and thus obviate the necessity to bend the same.

Although we have shown the bracket for attaching the dust-guard made in a separate piece, so that it can be attached to couplings now in use, it may be cast integral with the coupling-head in couplings hereafter constructed, if desired.

The operation is as follows: When the parts of the coupling are disconnected from each other, as is the case in uncoupling cars, or in any other event, the spring will automatically force the dust-guard on each part of the coupling laterally over the air-opening of the said coupling, and thereby close the air-opening sufficiently to exclude dust, dirt, cinders, &c., from the train-pipe, but at the same time not so closely as to interfere with the escape of sufficient air to apply the brakes should the train become parted accidentally.

The spiral spring not only operates to swing the dust-guard over the air opening or port of the coupling, but also moves it laterally and presses it against the packing-ring therein.

Having thus described our invention, what we claim is—

1. A dust-guard for brake-couplings comprising a bracket, a lever pivoted thereto having a handle and a head at opposite ends, and a spring for swinging said lever and moving it laterally, substantially as shown and described.

2. A dust-guard for a brake-coupling comprising a bracket provided with a lug, a lever pivoted thereto having a handle and a head at opposite ends, a stop, and a spring for swinging said lever and moving it laterally, substantially as shown and described.

3. A dust-guard for brake-couplings comprising a lever provided with a head at one end having the lower edge of its inner face beveled, a handle at the opposite end, means for pivotally attaching the lever to a brake-coupling, and means for operating the same, substantially as shown and described.

4. A dust-guard for brake-couplings comprising a bracket, a lever pivoted thereto having a handle at one end, and a recessed head at the opposite end with the lower edge of its inner face beveled, and means for operating said lever, substantially as shown and described.

5. A dust-guard for a two-part brake-coupling comprising a detachable bracket adapted to be secured to each part of said coupling, each having a lever pivoted thereon provided with a flat circular head with a beveled lower edge, a handle, a depending stop adapted to contact with said head and limit the downward movement thereof, and means for operating said lever, substantially as shown and described.

6. In a dust-guard for brake-couplings a lever having a head with the lower edge of its inner face beveled, substantially as shown and described.

In testimony whereof we hereto affix our signatures in the presence of two witnesses.

RICHARD H. NYLAND.
FREDERICK C. LINDT.

Witnesses:
HOWARD McKENZIE,
H. G. WISE.